United States Patent
Shin

(10) Patent No.: US 9,763,111 B2
(45) Date of Patent: Sep. 12, 2017

(54) METHOD FOR DETERMINING PAIR OF TARGET RECEIVER AND TARGET TRANSMITTER DISTRIBUTEDLY AND CONCENTRATEDLY USING COOPERATION HEADER IN A MULTI-HOP NETWORK PERFORMING INTERFERENCE NEUTRALIZATION

(71) Applicant: SAMSUNG ELECTRONICS CO., LTD., Suwon-si (KR)

(72) Inventor: Won Jae Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 13/845,358

(22) Filed: Mar. 18, 2013

(65) Prior Publication Data

US 2014/0003264 A1    Jan. 2, 2014

(30) Foreign Application Priority Data

Jun. 29, 2012    (KR) ........................ 10-2012-0071379

(51) Int. Cl.
*H04W 24/02*    (2009.01)
*H04B 7/04*    (2017.01)
(Continued)

(52) U.S. Cl.
CPC ............ *H04W 24/02* (2013.01); *H04B 7/026* (2013.01); *H04B 7/0417* (2013.01);
(Continued)

(58) Field of Classification Search
None
See application file for complete search history.

(56) References Cited

U.S. PATENT DOCUMENTS 7,162,454 B1 *   1/2007   Donner .................. G06Q 10/02
                                                        235/382
7,792,138 B2 *   9/2010   Hahm et al. .................. 370/462
(Continued)

FOREIGN PATENT DOCUMENTS

JP       2009-537098 A       10/2009
KR   10-2009-0052751 A        5/2009
(Continued)

OTHER PUBLICATIONS

Japanese Office Action dated Jul. 4, 2017 in corresponding Japanese Patent Application No. 2013-136181 (2 Pages in Japanese and 2 pages in English).

*Primary Examiner* — Hicham Foud
(74) *Attorney, Agent, or Firm* — NSIP Law

(57) ABSTRACT

A method of determining a pair of a target transmission node and a target reception node distributedly and concentratedly using a cooperation header in a multi-hop network performing interference neutralization, is provided. The method of distributedly determining the pair of the transmission node and the reception node includes determining whether any of other reception nodes broadcasts a pair configuration message to configure a pair between a corresponding one of the other reception nodes and the transmission node. The method further includes configuring the pair between the transmission node and the reception node based on the determination.

17 Claims, 17 Drawing Sheets

(51) Int. Cl.
*H04B 7/06* (2006.01)
*H04B 7/02* (2017.01)
*H04B 7/155* (2006.01)
*H04W 24/10* (2009.01)
*H04B 7/0417* (2017.01)
*H04B 7/026* (2017.01)

(52) U.S. Cl.
CPC ....... *H04B 7/0689* (2013.01); *H04B 7/15592* (2013.01); *H04B 7/15557* (2013.01); *H04W 24/10* (2013.01)

(56) References Cited

U.S. PATENT DOCUMENTS

| | | | |
|---|---|---|---|
| 7,826,337 B2 | 11/2010 | Shi et al. | |
| 8,059,573 B2* | 11/2011 | Julian et al. | 370/312 |
| 9,060,285 B2* | 6/2015 | Salonidis | H04W 24/02 |
| 9,265,089 B2* | 2/2016 | Gonikberg | H04W 8/005 |
| 2002/0114377 A1* | 8/2002 | Schmidl | H04W 72/02 |
| | | | 375/132 |
| 2004/0073321 A1* | 4/2004 | Kondo | H04N 5/44 |
| | | | 700/28 |
| 2005/0058091 A1* | 3/2005 | Rudd | H04M 1/215 |
| | | | 370/315 |
| 2006/0188004 A1* | 8/2006 | Kizu | H04B 1/715 |
| | | | 375/132 |
| 2007/0281617 A1* | 12/2007 | Meylan | H04W 16/14 |
| | | | 455/41.2 |
| 2008/0274692 A1* | 11/2008 | Larsson | 455/24 |
| 2009/0067389 A1* | 3/2009 | Lee | H04W 74/02 |
| | | | 370/336 |
| 2009/0196273 A1* | 8/2009 | Kwon et al. | 370/343 |
| 2009/0238163 A1* | 9/2009 | Zhang | H04W 24/02 |
| | | | 370/338 |
| 2010/0238816 A1* | 9/2010 | Suh et al. | 370/252 |
| 2010/0315957 A1* | 12/2010 | Koo et al. | 370/246 |
| 2011/0142013 A1* | 6/2011 | Manssour et al. | 370/336 |
| 2011/0207492 A1* | 8/2011 | Jeon et al. | 455/509 |
| 2012/0052793 A1* | 3/2012 | Brisebois | H04W 88/06 |
| | | | 455/1 |
| 2012/0236704 A1* | 9/2012 | Tao et al. | 370/203 |

FOREIGN PATENT DOCUMENTS

| | | |
|---|---|---|
| KR | 10-0901377 B1 | 6/2009 |
| KR | 10-0976502 B1 | 8/2010 |
| KR | 10-2010-0114933 A | 10/2010 |
| KR | 10-2010-0119443 A | 11/2010 |
| KR | 10-1039855 B1 | 6/2011 |
| KR | 10-2012-0001461 A | 1/2012 |
| KR | 10-1102084 B1 | 1/2012 |
| WO | WO 2009/107314 A1 | 9/2009 |

\* cited by examiner

|      | From Tx 1 | From Tx 2 |
|------|-----------|-----------|
| Rx 1 | ③         | 1         |
| Rx 2 | 2         | 3         |
| Rx 3 | 0         | 2         |
| Rx 4 | 1         | ④         |

FIG. 8

| From Tx 1 | Codeword index | CQI level |
|---|---|---|
| Rx 1 | 00 | 3 |
| Rx 2 | 01 | 2 |
| Rx 3 | 01 | ④ |
| Rx 4 | 10 | 1 |

| From Tx 2 | Codeword index | CQI level |
|---|---|---|
| Rx 1 | 00 | 2 |
| Rx 2 | 01 | ④ |
| Rx 3 | 00 | 2 |
| Rx 4 | 10 | 0 |

|  | Codeword index | CQI level | Tx |
|---|---|---|---|
| Rx 1 | 00 | 3 | ①  |
| Rx 2 | 00 | 4 | ② |
| Rx 3 | 01 | 4 | 1 |
| Rx 4 | 10 | 1 | 1 |

FIG. 12

|      | CB index 1 | CQI 1 | Tx 1 | CB index 2 | CQI 2 | Tx 2 |
|------|------------|-------|------|------------|-------|------|
| Rx 1 | 00         | 3     | 1    | 1          | 3     | 1    |
| Rx 2 | 01         | 2     | 2    | 2          | 5     | ⓪    |
| Rx 3 | 00         | 0     | 1    | 1          | 1     | 2    |
| Rx 4 | 10         | 1     | 1    | 1          | 0     | 1    |

METHOD FOR DETERMINING PAIR OF TARGET RECEIVER AND TARGET TRANSMITTER DISTRIBUTEDLY AND CONCENTRATEDLY USING COOPERATION HEADER IN A MULTI-HOP NETWORK PERFORMING INTERFERENCE NEUTRALIZATION

CROSS-REFERENCE TO RELATED APPLICATION(S)

This application claims the benefit under 35 U.S.C. §119 (a) of Korean Patent Application No. 10-2012-0071379, filed on Jun. 29, 2012, in the Korean Intellectual Property Office, the entire disclosure of which is incorporated herein by reference for all purposes.

BACKGROUND

1. Field

The following description relates to a method of determining a pair of a target transmission node and a target reception node distributedly and concentratedly using a cooperation header in a multi-hop network performing interference neutralization.

2. Description of Related Art

Multi-hop transmission may be widely utilized in an ad-hoc network. However, the ad-hoc network may have many difficulties in preparing for a network, for example, a cellular-based network including a control unit, in order to perform efficient multi-hop cooperation between terminals. Among the difficulties, exchange of channel information may be one of the most difficult processes from the perspective of a system, for example, from the perspective of overhead due to exchange of a channel information message, and mismatch of channel information due to a change of a channel while estimating a message and the channel.

Compared to the ad-hoc network, in many cases, the terminals in the network including the control unit may be more basically-synchronized. The network including the control unit may have resources assigned for exchange of channel information. That is, the network including the control unit may be regarded as a relatively easy structure for multi-hop transmission. However, as a number of users in a transmission range managed by the control unit increases, overhead due to exchange of channel information may also be predicted to increase. Accordingly, the overhead due to exchange of channel information may need to be limited in order to activate the multi-hop transmission.

For example, inter-user interference may need to be minimized so that a plurality of users may simultaneously perform multi-hop transmission. Exchange of channel information may simultaneously be needed to efficiently perform the multi-hop transmission.

SUMMARY

In one general aspect, there is provided a method of distributedly determining a pair of a transmission node and a reception node in a multi-hop network performing interference neutralization, the method including determining whether any of other reception nodes broadcasts a pair configuration message to configure a pair between a corresponding one of the other reception nodes and the transmission node. The method further includes configuring the pair between the transmission node and the reception node based on the determination.

In another general aspect, there is provided a method of concentratedly determining a pair of a transmission node and a reception node using a cooperation header in a multi-hop network performing interference neutralization, the method including determining a codeword index and channel quality information of the reception node with respect to each of transmission nodes. The method further includes feeding back, to the cooperation header, the codeword index and the channel quality information. The method further includes receiving, from the cooperation header, information about a paired reception node of each of the transmission nodes. The method further includes processing data received from each of the transmission nodes based on the information about the paired reception node of each of the transmission nodes.

Other features and aspects will be apparent from the following detailed description, the drawings, and the claims.

BRIEF DESCRIPTION OF THE DRAWINGS

FIG. 8 is a diagram illustrating examples of tables used to concentratedly determine a pair of a target transmission node and a target reception node in a multi-hop network performing interference neutralization.

FIG. 12 is a diagram illustrating an example of a table including a codeword index, corresponding channel quality information, and information associated with a transmission node that are fed back from a target reception node to a cooperation header and that are recommended for the target reception node to support a single-user diversity mode in a multi-hop network performing interference neutralization.

Figure 1:
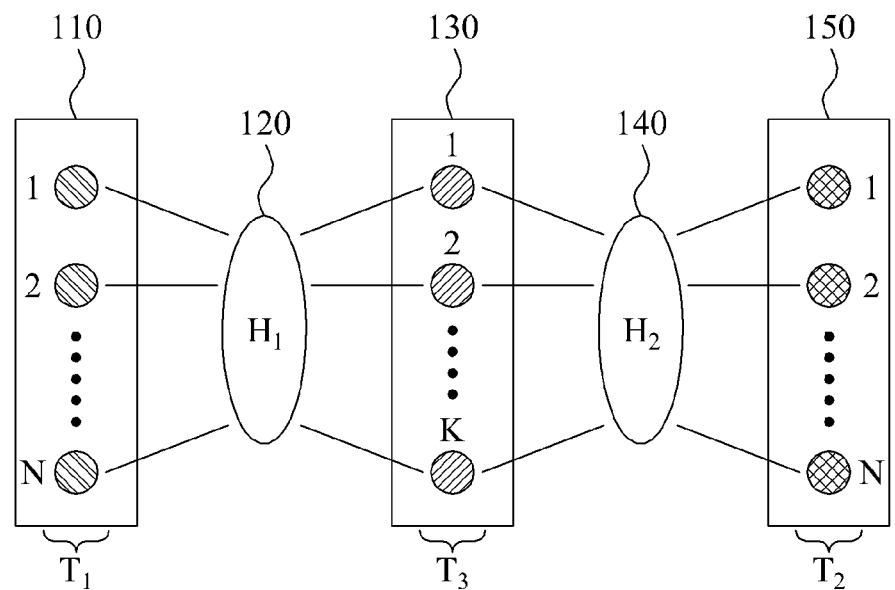
FIG. 1 is a diagram illustrating an example of a multi-hop network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a multi-hop network. Referring to FIG. 1, in the multi-hop network, transmission nodes 110 ("T$_1$") transmits data to reception nodes 150 ("T$_2$") through relay nodes 130 ("T$_3$"), respectively. An example of the multi-hop network may include users of a cellular system that transmit data to base stations through relays. A channel formed between the transmission nodes 110 and the relay nodes 130 is H$_1$ 120, and a channel formed between the relay nodes 130 and the reception nodes 150 is H$_2$ 140.

When pairs of the transmission nodes 110 and the reception nodes 150 simultaneously transmit data, signals or streams between the different pairs of the transmission nodes 110 and the reception nodes 150 may be mixed during a multi-hop process, and inter-stream interference may occur. Accordingly, to manage interference, the relay nodes 130 perform interference neutralization and interference cancellation between the pairs of the transmission nodes 110 and the reception nodes 150.

Figure 2:
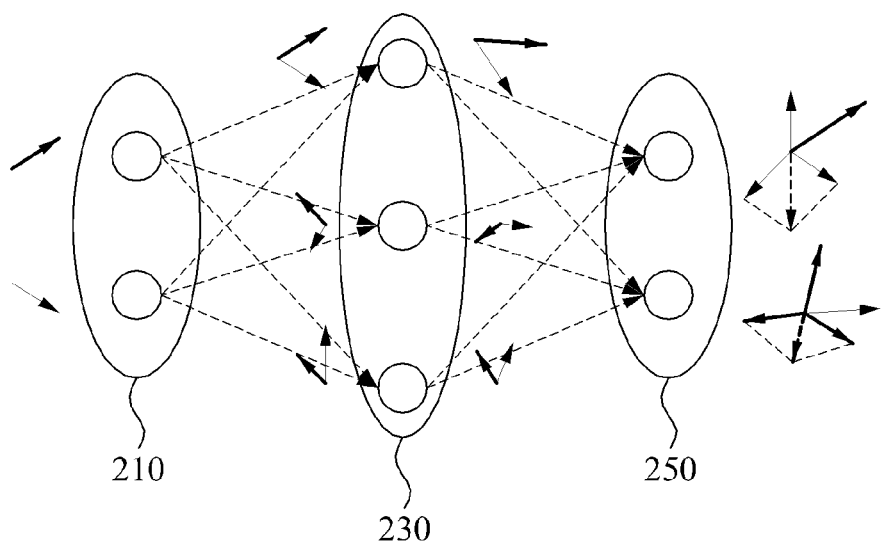
FIG. 2 is a diagram illustrating an example of interference neutralization performed in a multi-hop network.

FIG. 2 illustrates an example of interference neutralization performed in a multi-hop network. A multi-hop transmission gain in a signal processing aspect may occur in the multi-hop network. That is, multi-hop transmission in the multi-hop network may be used to reduce a size of a cell, and to decrease transmission power. Accordingly, in the multi-hop network, interference may decrease whereby a power gain may be achieved. This power gain may correspond to the multi-hop transmission gain.

Interference may be controllable using multiple hops in a signal processing aspect, and accordingly, a multi-hop transmission gain may be achieved. In more detail, a relay node that transfers a signal may adjust its gain to perform interference neutralization, which may cancel interference at a reception node.

Interference neutralization may be implemented in a multiple unicast multi-hop network. Interference neutralization will be described using the following example of FIG. 2.

Referring to FIG. 2, in the multi-hop network, transmission nodes 210 transmits data to reception nodes 250 through relay nodes 230, respectively. In more detail, the relay nodes 230 perform amplify-and-forward in the multi-hop network.

H$_1$ denotes a channel formed between the transmission nodes 210 and the relay nodes 230, and H$_2$ denotes a channel formed between the relay nodes 230 and the reception nodes 250. An amplifying coefficient to be used by the relay nodes 230 to multiply is expressed as a G matrix.

If each of the nodes within the multi-hop network includes a single antenna, the G matrix is a diagonal matrix. Accordingly, an effective channel gain from the transmission nodes 210 through the relay nodes 230 to the reception nodes 250 to which a signal is transferred may be expressed by the following example of Equation (1). In this example, inter-stream interference needs to be completely cancelled for interference neutralization, and thus, the G matrix may be designed so that the effective channel gain may be generated as a diagonal matrix as shown in the following example of Equation (1).

$$H_2GH_1 = \begin{bmatrix} h_1^{(2)} \\ h_2^{(2)} \\ \vdots \\ h_N^{(2)} \end{bmatrix} \begin{bmatrix} g_1 & 0 & \cdots & 0 \\ 0 & g_2 & \cdots & 0 \\ \vdots & \vdots & \ddots & \vdots \\ 0 & 0 & \cdots & g_K \end{bmatrix} [h_1^{(1)} \quad h_2^{(1)} \quad \cdots \quad h_N^{(1)}] \quad (1)$$

-continued $$= \begin{bmatrix} h_1^{(2)} \\ h_2^{(2)} \\ \vdots \\ h_N^{(2)} \end{bmatrix} G [ h_1^{(1)} \quad h_2^{(1)} \quad \ldots \quad h_N^{(1)} ]$$

$$= \begin{bmatrix} h_1^{(2)} G \\ h_2^{(2)} G \\ \vdots \\ h_N^{(2)} G \end{bmatrix} [ h_1^{(1)} \quad h_2^{(1)} \quad \ldots \quad h_N^{(1)} ]$$

$$= \begin{bmatrix} h_1^{(2)} G h_1^{(1)} & h_1^{(2)} G h_2^{(1)} & \ldots & h_1^{(2)} G h_N^{(1)} \\ h_2^{(2)} G h_1^{(1)} & h_2^{(2)} G h_2^{(1)} & \ldots & h_2^{(2)} G h_N^{(1)} \\ \vdots & \vdots & \ddots & \vdots \\ h_N^{(2)} G h_1^{(1)} & h_N^{(2)} G h_2^{(1)} & \ldots & h_N^{(2)} G h_N^{(1)} \end{bmatrix}$$

$$= \begin{bmatrix} \alpha_1 & 0 & \ldots & 0 \\ 0 & \alpha_2 & \ldots & 0 \\ \vdots & \vdots & \ddots & \vdots \\ 0 & 0 & \ldots & \alpha_N \end{bmatrix}$$

Equation (1) may be transformed to the following examples of Equation (2) and Equation (3) based on a linear algebra characteristic.

$$\Leftrightarrow \begin{bmatrix} g_1 \\ g_2 \\ \vdots \\ g_N \end{bmatrix}^T \underbrace{\begin{bmatrix} h_1^{(2)T} \cdot h_2^{(1)} \ldots h_1^{(2)T} \cdot h_N^{(1)} \; h_2^{(2)T} \cdot h_1^{(1)} \ldots \\ h_2^{(2)T} \cdot h_N^{(1)} \; h_N^{(2)T} \cdot h_1^{(1)} \ldots h_N^{(2)T} \cdot h_{N-1}^{(1)} \end{bmatrix}}_{K \times (N-1)N} = [0 \quad 0 \quad \ldots \quad 0] \quad (2)$$

$$\left( \because a^T G b = [a_1 \quad \ldots \quad a_N] \begin{bmatrix} g_1 & 0 & \ldots & 0 \\ 0 & g_2 & \ldots & 0 \\ \vdots & \vdots & \ddots & \vdots \\ 0 & 0 & \ldots & g_K \end{bmatrix} \begin{bmatrix} b_1 \\ \vdots \\ b_N \end{bmatrix} \right. \quad (3)$$

$$= [a_1 g_1 \quad a_2 g_2 \quad \ldots \quad a_N g_N] \begin{bmatrix} b_1 \\ \vdots \\ b_N \end{bmatrix}$$

$$= \sum_{i=1}^{N} a_i b_i g_i$$

$$\left. = [a_1 b_1 \quad a_2 b_2 \quad \ldots \quad a_N b_N] \begin{bmatrix} g_1 \\ \vdots \\ g_N \end{bmatrix} \right)$$

Accordingly, an interference neutralization condition obtainable from the above equations may be expressed by the following example of Equation (4).

$$K_1 \geq ((N-1)N) + 1 \quad (4)$$

In Equation (4), $K_1$ denotes a minimum number of relay nodes that are needed to perform interference neutralization when each of N pairs of transmission nodes and reception nodes transmits a signal using multiple hops. For example, as illustrated in FIG. 2, in the multi-hop network in which the N pairs of transmission nodes and reception nodes is two, the minimum number $K_1$ of relay nodes 230 needed to perform interference neutralization is calculated as $K_1=(N(N-1))+1=3$, according to Equation (4).

As described above, when the relay nodes 230 perform amplify-and-forward and interference neutralization, the interfering multi-hop network including a topology of FIG. 2 may be expressed as an equivalent single-hop network. In addition, since all interference is cancelled in a channel, the multi-hop network is a multiple peer-to-peer network. Even though signals transmitted by the transmission nodes 210 through a channel interfere with each other while passing through the relay nodes 230, the interference neutralization enables only an interference-free signal in which interference is offset to be transferred to the reception nodes 250.

Figure 3:
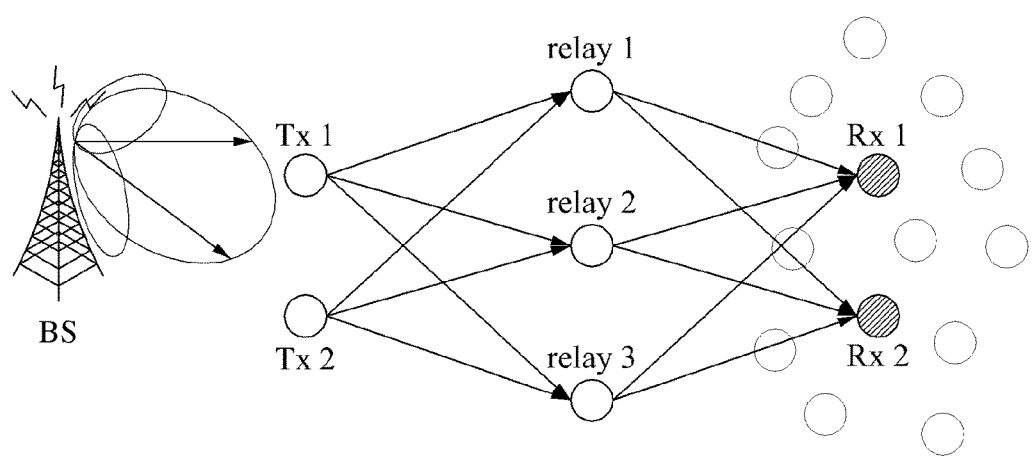
FIG. 3 is a diagram illustrating an example of distributedly determining a pair of a target transmission node and a target reception node in a multi-hop network performing interference neutralization.
Figures 5, 6:
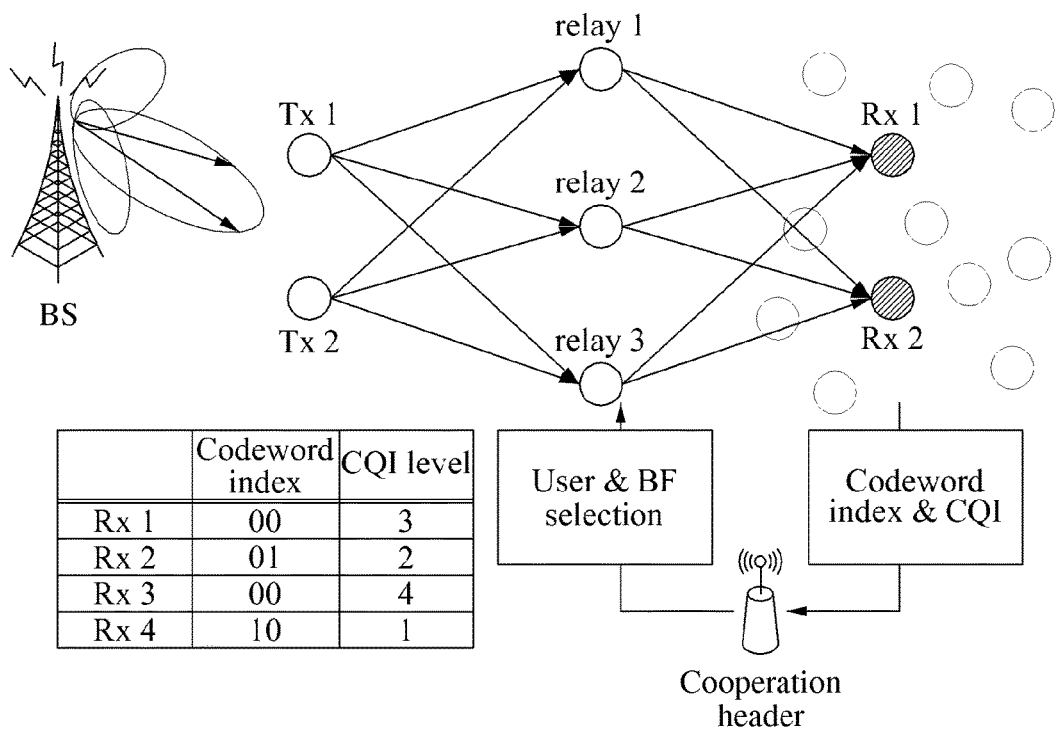
FIG. 5 is a diagram illustrating an example of a table used to distributedly determine a pair of a target transmission node and a target reception node in a multi-hop network performing interference neutralization.
FIG. 6 is a diagram illustrating an example of concentratedly determining a pair of a target transmission node and a target reception node using a cooperation header in a multi-hop network performing interference neutralization.

A transmission method of neutralizing interference by appropriately selecting a user, such as a reception node or a relay node, without transfer or exchange of channel information will be described in the following examples. The transmission method may be divided into two types based on a control entity. For example, a user may be selected distributedly in an ad-hoc network as illustrated in FIG. 3, and the user may also be selected using a cooperation header as illustrated in FIG. 6. The cooperation header may denote a radio communication node that supports a cooperation group temporarily or semi-permanently for cooperation, or may denote an infrastructure, for example, a relay node, an access point (AP), a base station, a mobile terminal, a marketplace to marketplace (M2M) device, and/or other infrastructure known to one of ordinary skill in the art.

Hereinafter, it is assumed that a base station in which a user selection is performed transmits data of two transmission nodes to two reception nodes, respectively, using a multiple input multiple output (MIMO) communication method and/or other methods known to one of ordinary skill in the art. The transmission nodes transmit data to the respective reception nodes over two hops. All of the reception nodes are aware of an effective channel formed between the transmission nodes and the reception nodes.

FIG. 3 illustrates an example of distributedly determining a pair of a target transmission node and a target reception node in a multi-hop network performing interference neutralization. Referring to FIG. 3, relay nodes (for example, relay 1, relay 2, and relay 3) receive, from a base station (for example, BS) or transmission nodes (for example, Tx1 and Tx2), data of reception nodes (for example, Rx1 and Rx2) selected from among final reception nodes. The relay nodes forward the received data to the reception nodes in a distributed form.

In FIG. 3, a transmission method of controlling interference through a user selection is configured in a distributed form. In more detail, in a time division duplex (TDD) system or a frequency division duplex (FDD) system, each reception node measures an effective channel from each transmission node to a corresponding reception node. The effective channel may vary based on a channel of a first hop, a channel of a second hop, and/or an operation of a relay node.

Each relay node may use an amplify-and-forward scheme that enables a received signal to pass through a linear filter without separately performing decoding. A coefficient of the linear filter may be set to a predetermined value. When the effective channel between the transmission nodes and the reception nodes is known, each reception node determines or selects a transmission node that provides the largest throughput to a corresponding reception node based on the effective channel.

For example, each reception node may transmit a pilot to each transmission node, and may calculate a signal-to-interference and noise ratio (SINR) between each transmission node and a corresponding reception node. Each reception node may determine a transmission node that provides the largest throughput to a corresponding reception node based on the SINR. In examples, an interference amount, signal power, and/or other parameters known to one of ordinary skill in the art, in addition to throughput, may be utilized as a selection criterion to select a transmission node.

In the example of selecting a transmission node based on throughput, the following method may be utilized. When a reception node estimates throughput of each transmission node, determining which transmission node transmits information to which reception node may be performed only when all channel information between the respective nodes is known at once. However, it may be verify difficult to exchange information in a distributed system.

According to this example, by introducing a distributed timer of each transmission node, it is possible to select transmission nodes capable of achieving the optimal efficiency or quality without separately exchanging channel information. The distributed timer may be operated using an independent resource, for example, a frequency, a time, a code, and/or other parameters known to one of ordinary skill in the art, of a corresponding transmission node. The distributed timer may be set to be in proportion to an inverse number of the throughput of a corresponding transmission node.

Each reception node determines a standby time of a predetermined message to be broadcast by a corresponding reception node based on the distributed timer of a corresponding transmission node, for each transmission node. When a determined standby time is terminated or reached, a target reception node broadcasts a corresponding predetermined message (for example, a hello message, a pair configuration message, a pilot, and/or other messages known to one of ordinary skill in the art) to all of the neighboring reception nodes and a target transmission node corresponding to the determined standby time. The target reception node that transmits the predetermined message is regarded to be activated, and the target transmission node may provide the largest throughput to the target reception node.

The target reception node broadcasts the predetermined message of the target reception node unless the neighboring reception nodes broadcast a message. In this example, through the broadcast predetermined message, the target reception node informs that the target reception node may be configured as a pair together with the target transmission node. Accordingly, using a distributed timer, a transmission node that achieves the largest throughput may be distributedly determined for each reception node.

The base station may transmit data to a transmission node that is selected by a reception node, using a multi-user MIMO communication scheme. Next, the transmission node may decode the received message, and may forward the decoded message to a relay node. The relay nodes may operate similar to obtaining the effective channel.

Figure 4:
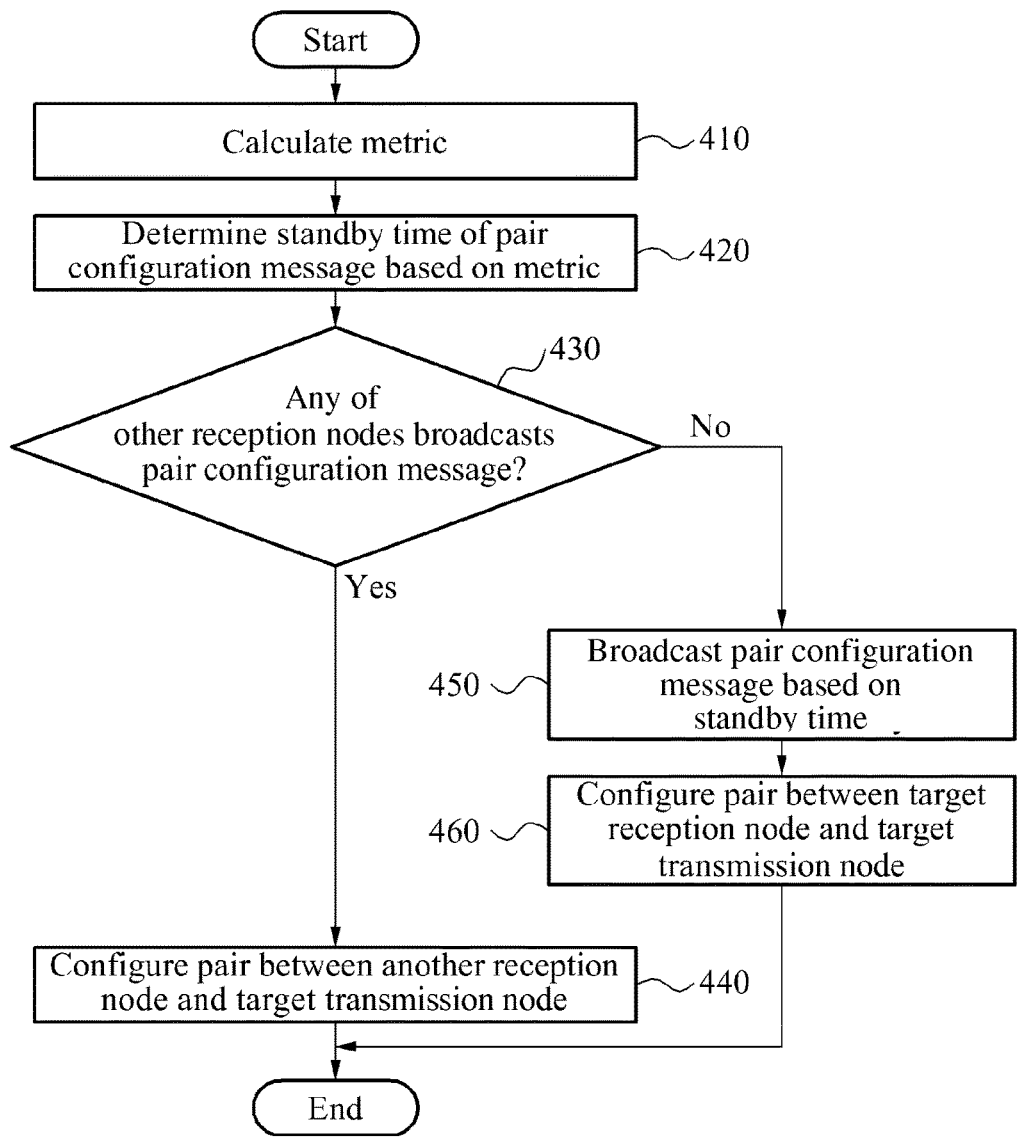
FIG. 4 is a flowchart illustrating an example of a method of distributedly determining a pair of a target transmission node and a target reception node in a multi-hop network performing interference neutralization.

FIG. 4 illustrates an example of a method of distributedly determining a pair of a target transmission node and a target reception node in a multi-hop network performing interference neutralization. Referring to FIG. 4, in operation 410, the target reception node calculates a predetermined metric between the target transmission node and the target reception node. For example, the metric may include throughput, an amount of interference, a signal strength, and/or other parameter known to one of ordinary skill in the art.

In operation 420, the target reception node determines a standby time of a pair configuration message to be broadcasted by the target reception node based on the metric. The pair configuration message is used to configure a pair between the target reception node and the target transmission node. In this example, the target reception node may determine the standby time of the pair configuration message based on a distributed timer of the target transmission node that is set based on the metric.

In operation 430, the target reception node determines whether any of other reception nodes broadcasts a pair configuration message in order to configure a pair between a corresponding one of the other reception nodes and the target transmission node. If the target reception node determines that any of the other reception nodes broadcasts a pair configuration message, the method continues in operation 440. Otherwise, the method continues in operation 450.

In operation 440, the target reception node does not broadcast the pair configuration message of the target reception node, and a pair is configured between another reception node and the target transmission node.

In operation 450, the target reception node broadcasts the pair configuration message of the target reception node to the other reception nodes and the target transmission node based on the standby time.

In operation 460, the target reception node configures a pair together with the target transmission node that receives the pair configuration message of the target reception node.

FIG. 5 illustrates an example of a table used to distributedly determine a pair of a target transmission node and a target reception node in a multi-hop network performing interference neutralization. Referring to FIG. 5, it can be known that with respect to a first transmission node Tx1, throughput of a first reception node Rx1 is 3, which is highest among reception nodes Rx1, Rx2, Rx3, and Rx4. In this example, a distributed timer of each of the reception nodes may be set to be an inverse number of a predetermined metric, for example, throughput. Accordingly, the first reception node Rx1 including the highest throughput among the reception nodes Rx1, Rx2, Rx3, and Rx4 with respect to the first transmission node Tx1 may include the shortest standby time.

The first reception node Rx1 among the reception nodes Rx1, Rx2, Rx3, and Rx4 initially broadcasts a pair configuration message to the first transmission node Tx1. Based on the broadcast pair configuration message, the first transmission node Tx1 and the first reception node Rx1 are configured as a pair.

Also, it can be known that with respect to a second transmission node Tx2, throughput of a fourth reception node Rx4 is 4, which is highest among the reception nodes Rx1, Rx2, Rx3, and Rx4. Accordingly, the fourth reception node Rx4 initially broadcasts a pair configuration message to the second transmission node Tx2. Based on the broadcast pair configuration message, the second transmission node Tx2 and the fourth reception node Rx4 are configured as a pair.

In this example, the first reception node Rx1 configured as a pair together with the first transmission node Tx1 is an interference-neutralized reception node with respect to the first transmission node Tx1. Similarly, the fourth reception node Rx4 is an interference-neutralized reception node with respect to the second transmission node Tx2.

FIG. 6 illustrates an example of concentratedly determining a pair of a target transmission node and a target reception node using a cooperation header in a multi-hop network performing interference neutralization. Referring to FIG. 6, relay nodes (for example, relay 1, relay 2, and relay 3) receive, from a base station (for example, BS) or transmission nodes (for example, Tx1 and Tx2), data of reception nodes (for example, Rx1 and Rx2) selected from among final reception nodes. The relay nodes forward the received data to the reception nodes using the cooperation header.

In FIG. 6, a transmission method of controlling interference through a user selection is configured using the cooperation header (e.g., or the BS) or an infrastructure (e.g., at least one of the relay nodes) as illustrated in FIG. 6. In more detail, when employing the cooperation header or the infrastructure, a method of predetermining a set of linear filter coefficients and selecting a predetermined linear filter coefficient in a relay node is utilized. The set of linear filter coefficients is pre-shared in a form of a codebook. The codebook includes codewords.

For example, a set including a total of four linear filter coefficients may be expressed by the following example of Equation 5.

$$E = [e_1 \quad e_2 \quad e_3 \quad e_4]$$
$$\text{index} \quad 00 \quad 01 \quad 10 \quad 11$$
(5)

In Equation (5), E denotes a codebook indicating the set of the four linear filter coefficients, and $e_i$ denotes a codeword that constitutes the codebook. The codeword may be expressed in a (R)×1 vector form. (R) denotes a number of the relay nodes. That is, $e_i$ may be understood as a predetermined linear filter coefficient in a relay node.

To select a predetermined linear filter coefficient in a relay node, each of the reception nodes feeds back, to the cooperation header or the infrastructure, a preferred codeword index of the corresponding reception node that is used to generate a most excellent channel state with respect to each of the transmission nodes that is among the four linear filter coefficients, corresponding channel quality information, and/or other information known to one of ordinary skill in the art. The channel quality information may include, for example, a predicted channel quality indicator (CQI) level and/or other information known to one of ordinary skill in the art.

It is assumed that all of the cooperation header and/or cooperating nodes (e.g., the relay nodes) in the multi-hop network are aware of the four linear filter coefficients in the form of the codebook. Accordingly, instead of directly feeding back a linear filter coefficient and/or a message of the distributed method of FIG. 3, each of the reception nodes feeds back only two bits of the codeword index, and the channel quality information, as illustrated in FIG. 8.

The cooperation header or the infrastructure collects the codeword index and the channel quality information that is fed back from each of the reception nodes, and may express the collected information in the tables as illustrated in FIGS. 6 and/or 8 to correspond to the respective transmission nodes and reception nodes. The cooperation header or the infrastructure selects an optimal reception node (e.g., a user and a beamforming (BF)) based on the codeword index and the channel quality information, namely, the tables including such information, as will be described with more detail in FIG. 8.

Figure 9:
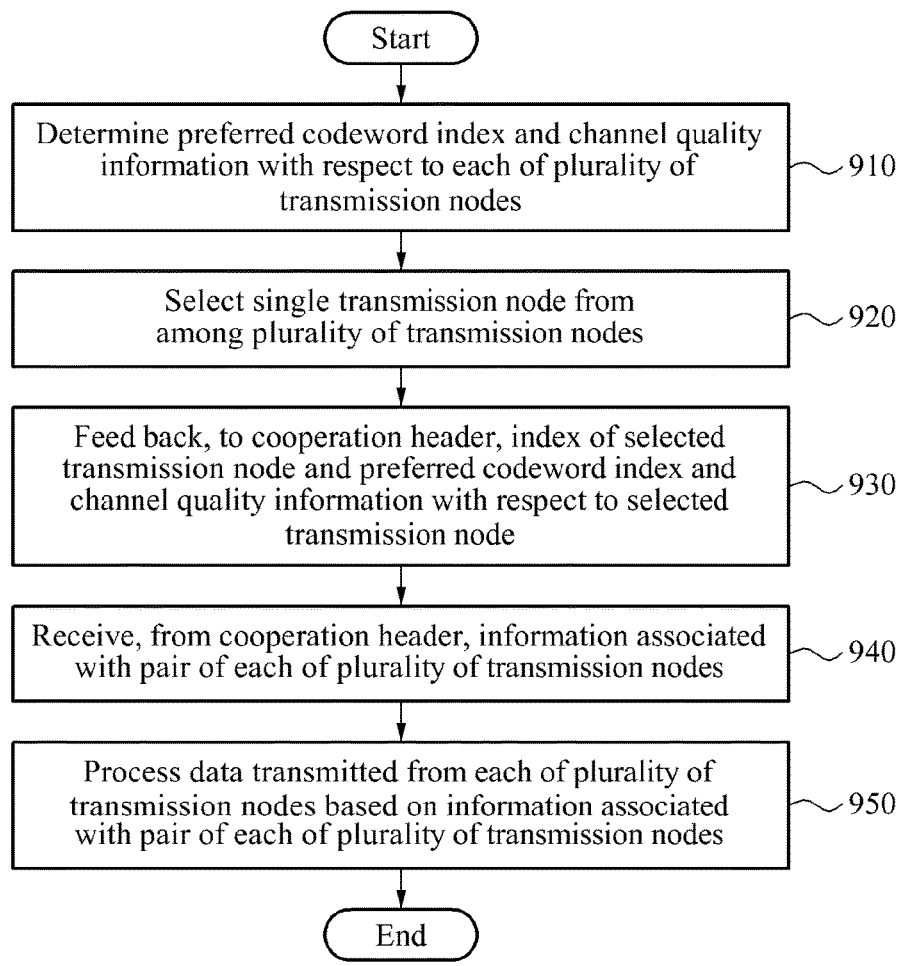
FIG. 9 is a flowchart illustrating an example of a method of informing, by a target reception node, a cooperation header about an index of a preferred transmission node in order to decrease an amount of feedback.
Figures 10, 11:
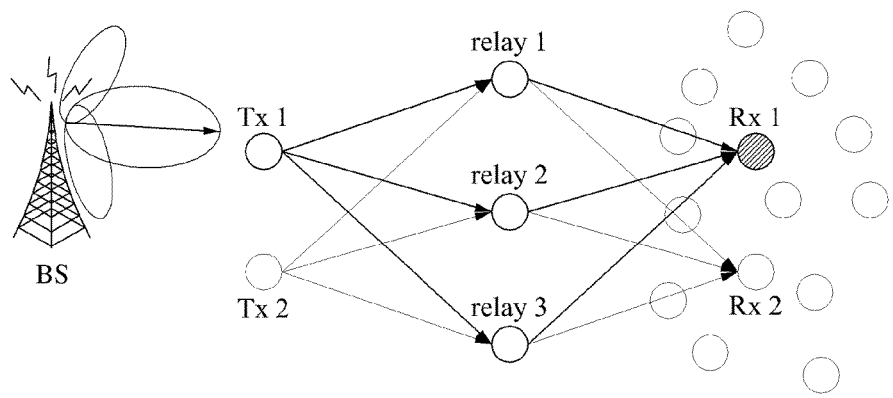
FIG. 10 is a diagram illustrating an example of a table including an index of a preferred transmission node that is fed back from a target reception node to a cooperation header in order to decrease an amount of feedback.
FIG. 11 is a diagram illustrating an example of a single-user diversity mode in a multi-hop network performing interference neutralization.

In other examples, to decrease an amount of feedback, a reception node may feed back, to a cooperation header, an index of an optimal transmission node for each reception node, a preferred codeword index and channel quality information with respect to the optimal transmission node, and/or other information known to one of ordinary skill in the art, as illustrated in FIG. 9 and FIG. 10.

Figure 7:
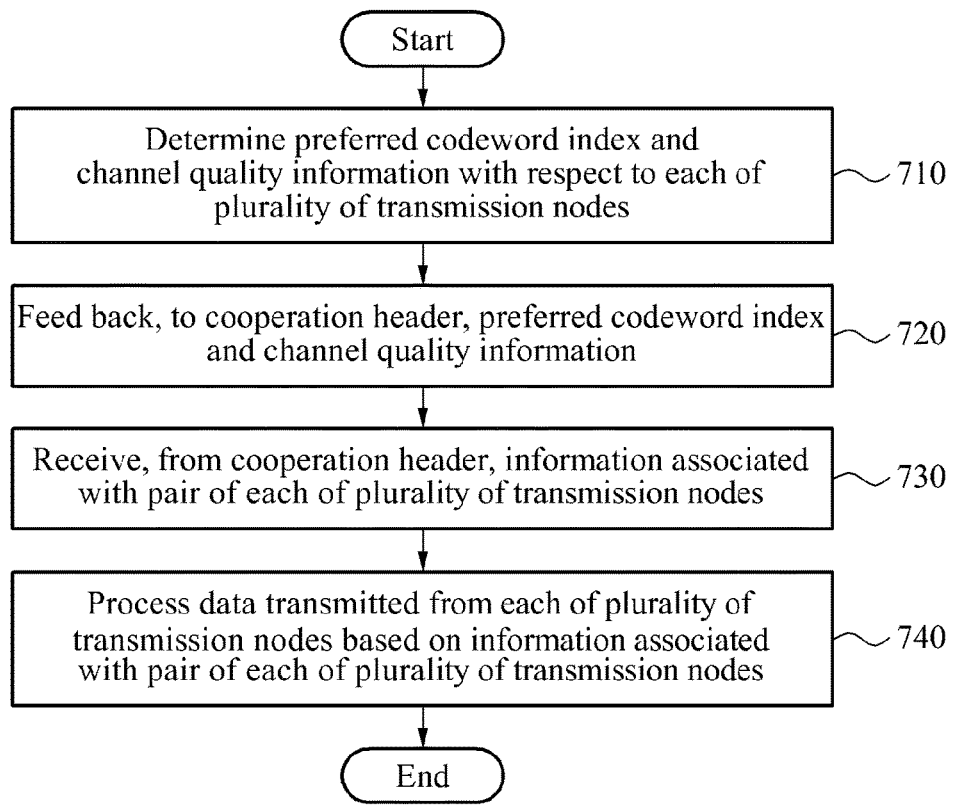
FIG. 7 is a flowchart illustrating an example of a method of concentratedly determining a pair of a target transmission node and a target reception node using a cooperation header in a multi-hop network performing interference neutralization.

FIG. 7 illustrates an example of a method of concentratedly determining a pair of a target transmission node and a target reception node using a cooperation header in a multi-hop network performing interference neutralization. Referring to FIG. 7, in operation 710, the target reception node determines a preferred codeword index and channel quality information (of the target reception node) with respect to each of a plurality of transmission nodes. The preferred codeword index includes a codeword index of the target reception node that is used to make a channel state to be most excellent with respect to each of the transmission nodes.

In operation 720, the target reception node feeds back, to the cooperation header, the determined preferred codeword index and channel quality information.

In operation 730, the target reception node receives, from the cooperation header, information associated with a pair of each of the plurality of transmission nodes. The information associated with the pair of each of the transmission nodes includes information associated with a reception node selected by the cooperation header as a pair with a transmission node for each of the transmission nodes based on the fed back preferred codeword index and channel quality information.

In operation 740, the target reception node processes data transmitted from each of the transmission nodes based on the information associated with the pair of each of the plurality of transmission nodes.

FIG. 8 illustrates examples of tables used to concentratedly determine a pair of a target transmission node and a target reception node in a multi-hop network performing interference neutralization. Referring to FIG. 8, a left one of the tables includes a preferred codeword index and channel quality information (e.g., a CQI level) with respect to a first transmission node Tx1 for each of reception nodes Rx1, Rx2, Rx3, and Rx4 that is received by a cooperation header. A right one of the tables includes preferred codeword index and channel quality information (e.g., a CQI level) with respect to a second transmission node Tx2 for each of the reception nodes Rx1, Rx2, Rx3, and Rx4 that is received by the cooperation header.

For example, with respect to the first transmission node Tx1 and the first reception node Rx1, the preferred codeword index is "00" and the CQI level is "3". With respect to the second transmission node Tx2 and the first reception node Rx1, the preferred codeword index is "00" and the CQI level is "2".

Accordingly, when the reception nodes share, with the cooperation header, a codeword index of a reception node capable of providing the highest channel quality information for each transmission node, cooperation for interference neutralization may be initiated. For example, the cooperation header may select, from among the reception nodes Rx1, Rx2, Rx3, and Rx4, a reception node including the highest channel quality information with respect to the first transmission node Tx1, for example, the third reception node Rx3 including the CQI level "4". Similarly, the cooperation header may select, from among the reception nodes Rx1, Rx2, Rx3, and Rx4, a reception node including the highest channel quality information with respect to the second transmission node Tx2, for example, the second reception node Rx2 including the CQI level "4".

Next, the cooperation header may configure the first transmission node Tx1 and the third reception node Rx3 as a pair, and may also configure the second transmission node Tx2 and the second reception node Rx2 as a pair. The cooperation header may transmit, to the third reception node Rx3 and the second reception node rx2, respectively, information associated with the first transmission node Tx1 and the second transmission node Tx2.

FIG. 9 illustrates an example of a method of informing, by a target reception node, a cooperation header about an index of a preferred transmission node in order to decrease an amount of feedback. Referring to FIG. 9, in operation 910, the target reception node determines a preferred codeword index and channel quality information (of the target reception node) with respect to each of a plurality of transmission nodes.

In operation 920, the target reception node selects the single transmission node from among the plurality of transmission nodes. The selected transmission node exhibits the highest channel quality information with the target reception node.

In operation 930, the target reception node feeds back, to the cooperation header, an index of the selected transmission node, and a preferred codeword index and channel quality information (of the target reception node) with respect to the selected transmission node.

In operation 940, the target reception node receives, from the cooperation header, information associated with a pair of each of the plurality of transmission nodes.

In operation 950, the target reception node processes data transmitted from each of the plurality of transmission nodes based on the information associated with the pair of each of the plurality of transmission nodes.

FIG. 10 illustrates an example of a table including an index of a preferred transmission node that is fed back from a target reception node to a cooperation header in order to decrease an amount of feedback. Referring to FIG. 10, instead of feeding back a preferred codeword index and channel quality information with respect to each of transmission nodes Tx1 and Tx2 for each of reception nodes Rx1, Rx2, Rx3, and Rx4 as illustrated in FIG. 8, the target reception node selects the preferred transmission node that exhibits the highest channel quality information with the target reception node. The target reception node feeds back, to the cooperation header, an index of the selected transmission node, and a preferred codeword index and channel quality information (e.g., a CQI level) with respect to the selected transmission node.

For example, referring to FIG. 8, with respect to the first transmission node Tx1 and the first reception node Rx1, the preferred codeword index is "00", and the CQI level is "3". With respect to the second transmission node Tx2 and the first reception node Rx1, the preferred codeword index is "00" and the CQI level is "2".

Accordingly, the first reception node Rx1 selects the first transmission node Tx1 including the highest CQI level with the first reception node Rx1, in comparison with the second transmission node Tx2. Referring to FIG. 10, the first reception node Rx1 feeds back, to the cooperation header, an index "1" of the selected first transmission node Tx1, and the preferred codeword index "00" and the CQI level "3" with respect to the first transmission node Tx1.

FIG. 11 illustrates an example of a single-user diversity mode in a multi-hop network performing interference neutralization. Referring to FIG. 11, relay nodes (for example, relay 1, relay 2, and relay 3) receive, from a base station (for example, BS) or transmission nodes (for example, Tx1 and Tx2), data of a target reception node (for example, Rx1) selected from among final reception nodes. The relay nodes forward the received data to the target reception node.

The multi-hop network performing the interference neutralization may simultaneously support multiple users (e.g., reception nodes), and may also support only a single user (e.g., a reception node) to enhance throughput of the single user. A mode of simultaneously supporting the multiple users is referred to as a "multi-user multiplexing mode", and a mode of supporting the single user is referred to as the "single-user diversity mode".

To support both the multi-user multiplexing mode and the single-user diversity mode, each of the reception nodes additionally feeds back, to a cooperation header, a codeword index, corresponding channel quality information, and information associated with (e.g., an index of) a transmission node, that are recommended for the corresponding reception node to support the single-user diversity mode, in addition to the aforementioned information of FIG. 10. The information fed back by each of the reception nodes may include a form of FIG. 12.

Based on the fed back information, the cooperation header or the base station determines whether to support the multiple users or the single user, and informs the reception nodes about a selected mode. A method of selecting, by the cooperation header, the multi-user multiplexing mode or the single-user diversity mode will be described with reference to FIG. 13.

FIG. 12 illustrates an example of a table including a codeword index, corresponding channel quality information, and information associated with a transmission node that are fed back from a target reception node to a cooperation header and that are recommended for the target reception node to support a single-user diversity mode in a multi-hop network performing interference neutralization. As discussed above, each reception node Rx1, Rx2, Rx3, or Rx4 determines and feeds back, to the cooperation header, an index of a transmission node that is selected to exhibit the highest channel quality information with the corresponding reception node, and a preferred codeword index and channel quality information (e.g., a CQI level) with respect to the selected transmission node, which are recommended for the corresponding reception node to simultaneously support multiple users in a multi-user multiplexing mode. Each reception node also feeds back, to the cooperation header, the codeword index, the corresponding channel quality information (e.g., a CQI level), and the information associated with (e.g., an index of) the transmission node, which are recommended for the corresponding reception node to support a single user in the single-user diversity mode.

Accordingly, as illustrated in FIG. 12, the cooperation header receives information, for example, CB index 1, CQI 1, Tx 1, CB index 2, CQI 2, and Tx2. CB index 1, CQI 1, and Tx1 denote the preferred codeword index and the CQI level with respect to the selected transmission node, and the index of the selected transmission node, respectively, that are recommended for each reception node to simultaneously support the multiple users in the multi-user multiplexing mode. CB index 2, CQI 2, and Tx2 denote the codeword index, the corresponding CQI level, and the index of the transmission node, respectively, that are recommended for each reception node to support the single user in the single-user diversity mode.

Figure 13:
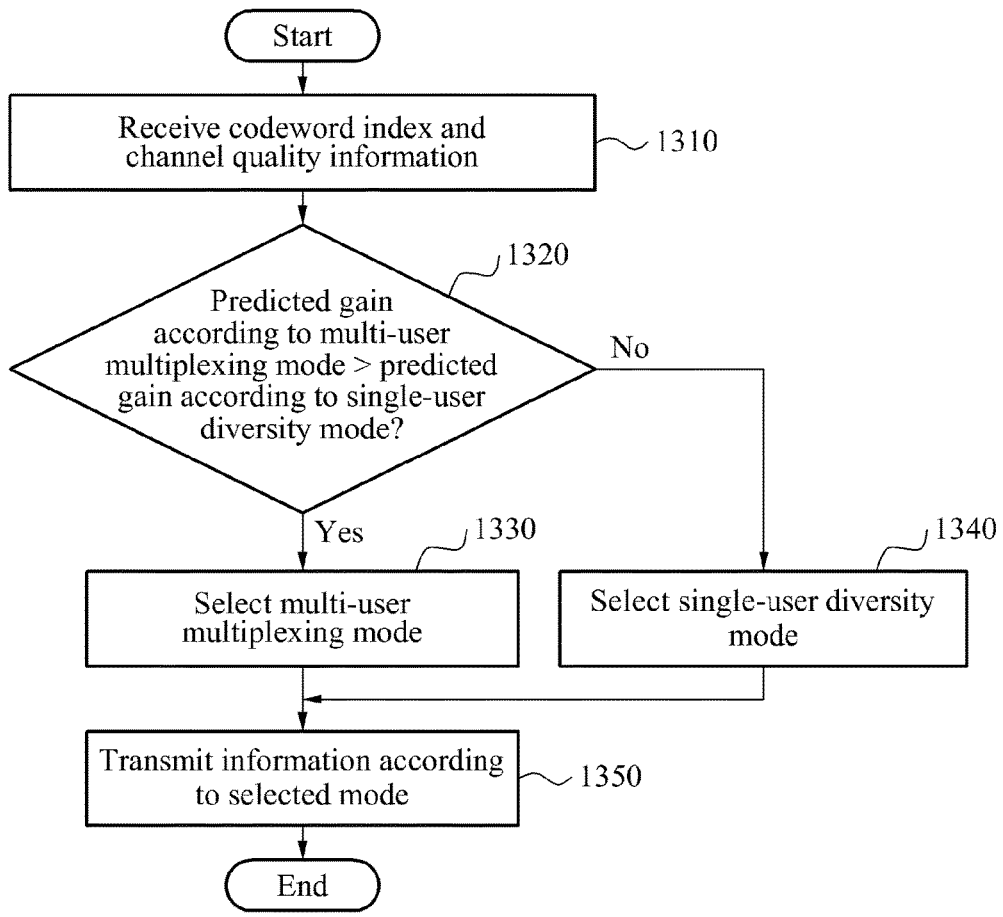
FIG. 13 is a flowchart illustrating an example of a method of selecting, by a cooperation header, a multi-user multiplexing mode or a single-user diversity mode.

FIG. 13 illustrates an example of a method of selecting, by a cooperation header, a multi-user multiplexing mode or a single-user diversity mode. Referring to FIG. 13, in operation 1310, the cooperation header receives, from each reception node, information, for example, the information of FIG. 12. The information includes an index of a transmission node that is selected to exhibit the highest channel quality information with the corresponding reception node, and a preferred codeword index and channel quality information (e.g., a CQI level) with respect to the selected transmission node, which are recommended for the corresponding reception node to simultaneously support multiple users in a multi-user multiplexing mode. The information also includes a codeword index, corresponding channel quality information (e.g., a CQI level), and information associated with (e.g., an index of) a transmission node, which are recommended for the corresponding reception node to support a single user in the single-user diversity mode.

In operation 1320, based on the fed back information, the cooperation header calculates a predicted gain (e.g., in a channel value) according to the multi-user multiplexing mode and a predicted gain (e.g., in a channel value) according to the single-user diversity mode. The cooperation header also determines whether the predicted gain according to the multi-user multiplexing mode is greater than the predicted gain according to the single-user diversity mode. If the predicted gain according to the multi-user multiplexing mode is greater than the predicted gain according to the single-user diversity mode, the method continues in operation 1330. Otherwise, the method continues in operation 1340.

In operation 1330, the cooperation header selects the multi-user multiplexing mode.

In operation 1340, the cooperation header selects the single-user diversity mode.

In operation 1350, the cooperation header (e.g., each relay node) transmits information to each reception node according to the selected mode.

Hereinafter, an example in which a number of relay nodes exceeds $N(N-1)+1$ will be described with reference to FIGS. 14 20. N denotes a number of pairs of transmission nodes and reception nodes in a multi-hop network performing interference neutralization.

An example of a multi-hop network performing interference neutralization will be described. As described above, $N(N-1)+1$ denotes a minimum number of relay nodes needed to perform complete interference neutralization by grouping data streams of N pairs of transmission nodes and reception nodes.

Accordingly, if the number of the pairs of the transmission nodes and the reception nodes is two or three, the minimum number of the relay nodes needed to perform complete the interference neutralization is three or seven, respectively. However, in examples, a large number of the relay nodes exceeding the minimum number of the relay nodes may be used. In these examples, performance of the interference neutralization may be enhanced.

Figure 14:
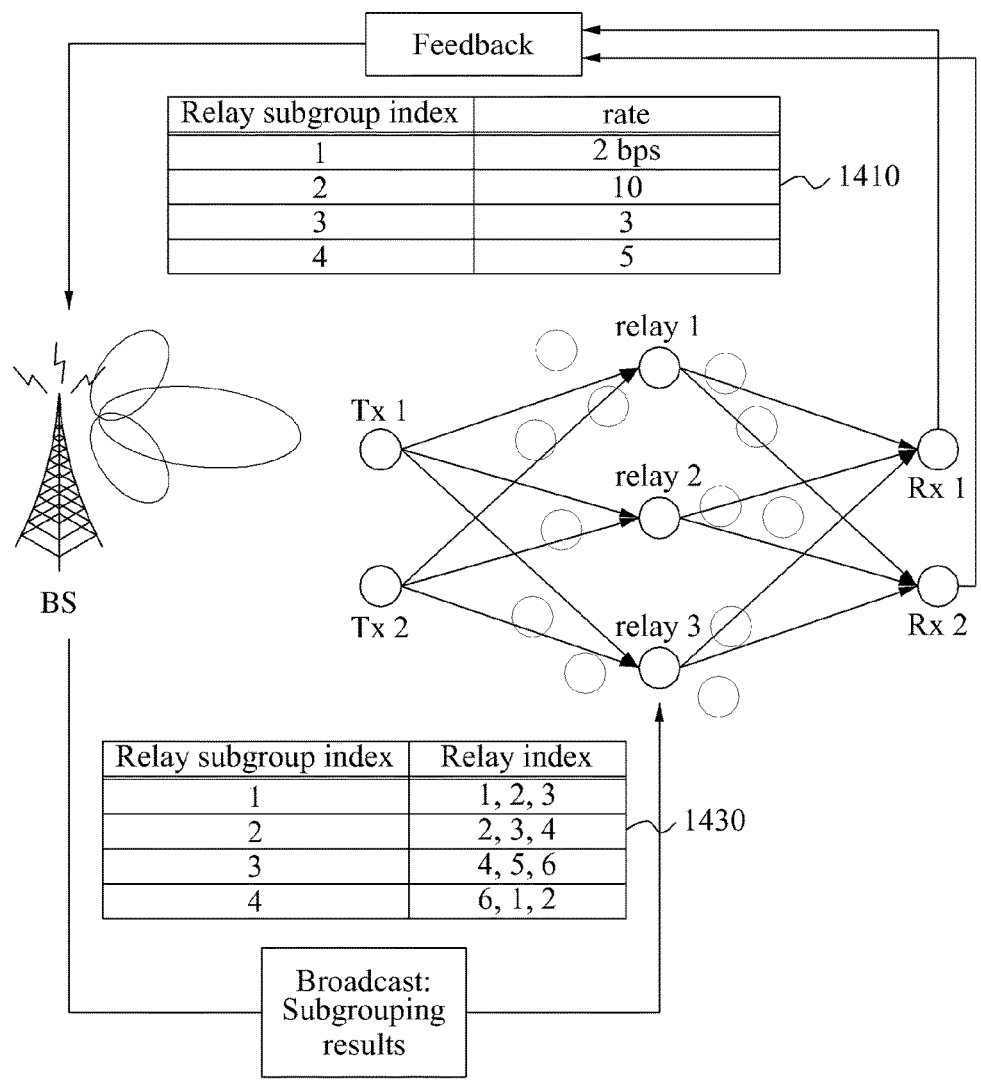
FIG. 14 is a diagram illustrating an example of a cooperation header concentratedly selecting relay nodes for a pair of a target transmission node and a target reception node when a number of relay nodes exceeds N(N−1)+1 where N denotes a number of pairs of transmission nodes and reception nodes in a multi-hop network performing interference neutralization.

FIG. 14 illustrates an example of a cooperation header concentratedly selecting relay nodes for a pair of a target transmission node and a target reception node when a number of relay nodes exceeds $N(N-1)+1$ where N denotes a number of pairs of transmission nodes and reception nodes in a multi-hop network performing interference neutralization. Referring to FIG. 14, the cooperation header or a base station (BS) groups the relay nodes (for example, relay 1, relay 2, and relay 3) included in the multi-hop network into at least two subgroups to relay a signal for the pair of the target transmission node Tx1 or Tx2 and the target reception node Rx1 or Rx2. Next, the cooperation header informs (e.g., broadcasts to) the relay nodes and the reception nodes about results of the grouping.

Each of the relay nodes relays, to the reception nodes, a reference signal sequentially transmitted from each of the transmission nodes based on a time slot assigned to each of the subgroups. Each of the reception nodes configures a metric to measure a link quality of each of the subgroups (hereinafter, a link quality metric) based on the reference signal. The link quality metric may be a value measured based on a channel.

As illustrated in a table 1410, each of the reception nodes feeds back, to the cooperation header, a relay subgroup index of a subgroup, and a corresponding link quality metric, e.g., a data rate. Feedback values of the reception nodes may vary based on operation technology.

The cooperation header selects a suitable subgroup to neutralize interference based on the values that are fed back from the reception nodes. The cooperation header informs the relay nodes and the reception nodes about information associated with the selected subgroup, for example, information as illustrated in a table 1430. In this example, the information includes a relay subgroup index of the selected subgroup, and relay indices of the relay nodes in the selected subgroup. Accordingly, selection of a cooperation group or a cluster for interference neutralization is completed.

Figure 15:
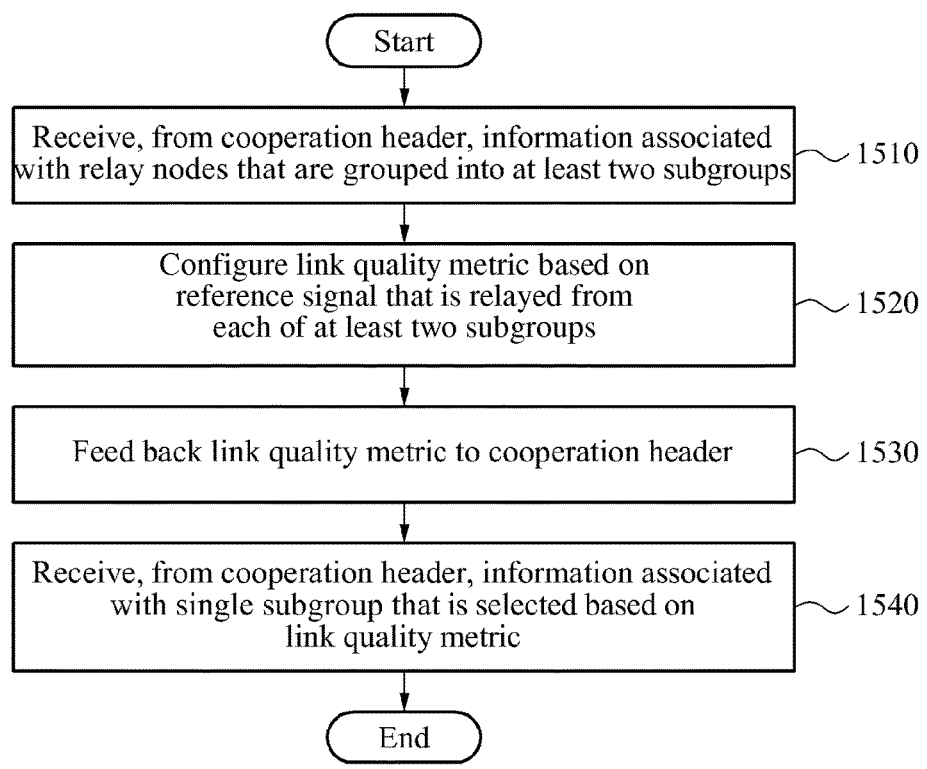
FIG. 15 is a flowchart illustrating an example of a method of an operation of a target reception node so that a cooperation header concentratedly selects relay nodes for a pair of a target transmission node and the target reception node when a number of relay nodes exceeds N(N−1)+1 where N denotes a number of pairs of transmission nodes and reception nodes in a multi-hop network performing interference neutralization.

FIG. 15 illustrates an example of a method of an operation of a target reception node so that a cooperation header concentratedly selects relay nodes for a pair of a target transmission node and the target reception node when a number of relay nodes exceeds $N(N-1)+1$ where N denotes a number of pairs of transmission nodes and reception nodes in a multi-hop network performing interference neutralization. Referring to FIG. 15, prior to performing the method of FIG. 9, in operation 1510, the target reception node receives, from the cooperation header, information associated with relay nodes that are grouped into at least two subgroups to relay a signal for the pair of the target transmission node and the target reception node.

In operation 1520, the target reception node configures a metric to measure a link quality of each of the subgroups, that is, a link quality metric, based on a reference signal that is relayed from each of the at least two subgroups. The reference signal may be sequentially relayed based on a time slot assigned to each of the at least two subgroups.

In operation 1530, the target reception node feeds back, to the cooperation header, the link quality metric together with a corresponding subgroup index. Information to be fed back may include a form as illustrated in the table 1410 of FIG. 14. The link quality metric may include, for example, a data rate.

In operation 1540, the target reception node receives, from the cooperation header, information associated with a single subgroup that is selected by the cooperation header based on the link quality metric to neutralize interference. The information to be received may include a form as illustrated in the table 1430 of FIG. 14.

Figure 16:
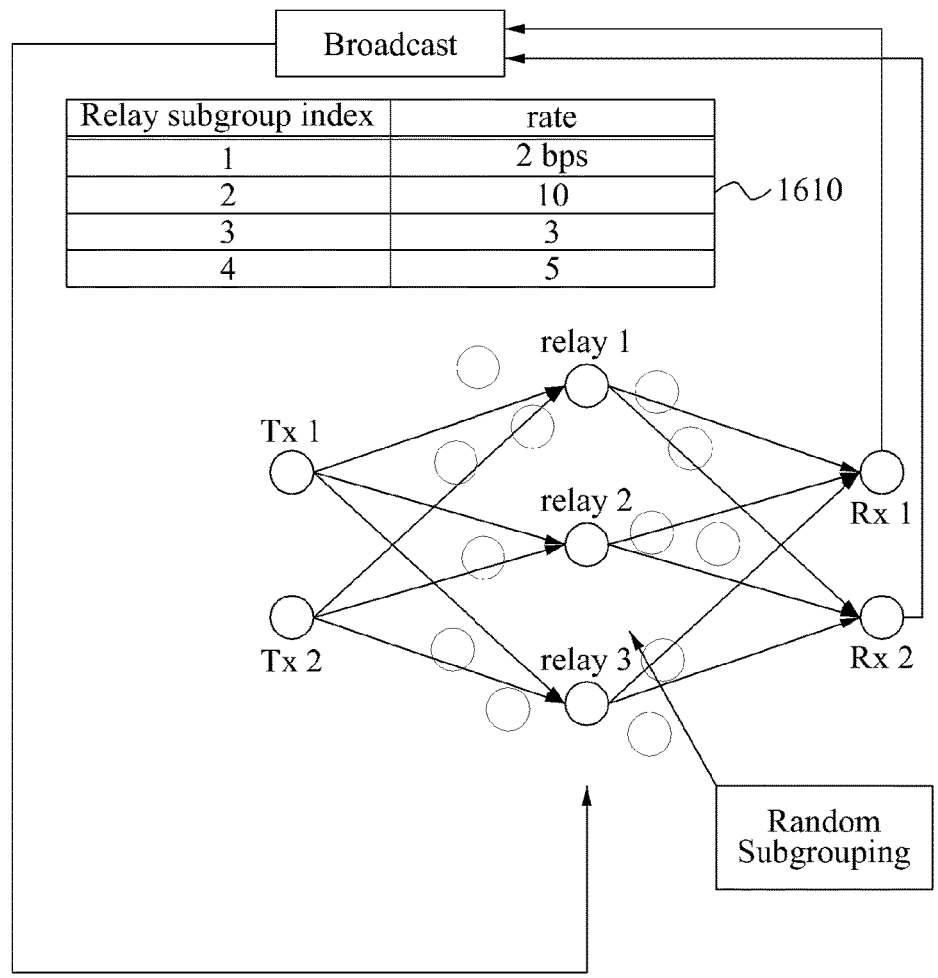
FIG. 16 is a diagram illustrating an example of distributedly selecting relay nodes for a pair of a target transmission node and a target reception node when a number of relay nodes exceeds N(N−1)+1 where N denotes a number of pairs of transmission nodes and reception nodes in a multi-hop network performing interference neutralization.

FIG. 16 illustrates an example of distributedly selecting relay nodes for a pair of a target transmission node and a target reception node when a number of relay nodes exceeds $N(N-1)+1$ where N denotes a number of pairs of transmission nodes and reception nodes in a multi-hop network performing interference neutralization. Referring to FIG. 16, when a control module, such as the cooperation header of FIG. 15, is absent, grouping the relay nodes into at least two subgroups may be performed randomly or in a predetermined order.

In more detail, each of the reception nodes monitors a reference signal relayed from each of the at least two subgroups, and measures a metric of each of the at least two subgroups based on results of the monitoring. The metric of each of the at least two subgroups may include a variety of channel-based metrics, for example, an SINR, an interference-to-noise ratio (INR), and/or other metrics known to one of ordinary skill in the art, in addition to a data rate. Any of the reception nodes may select a subgroup among the at least two subgroups based on the metric of each of the at least two subgroups.

The reception nodes directly broadcast results of the measurement to other nodes, e.g., other reception nodes and the relay nodes. Any of the relay nodes may select a subgroup among the at least two subgroups based on the metric of each of the at least two subgroups. In this example, one of the reception nodes may collect information associated with the other reception nodes and a subgroup selected by a corresponding reception node, and may inform the other reception nodes and the relay nodes about the information associated with the selected subgroup. Information transferred between the reception nodes and the other nodes may be a relay subgroup index of a subgroup and a corresponding metric as illustrated in a table 1610.

A reception node that has collected the results of the measurement and determined a relay node may broadcast the results of the subgrouping of the determined relay node. Accordingly, the reception node may complete the subgrouping of the relay nodes based on the results of the subgrouping of the determined relay node.

Figure 17:
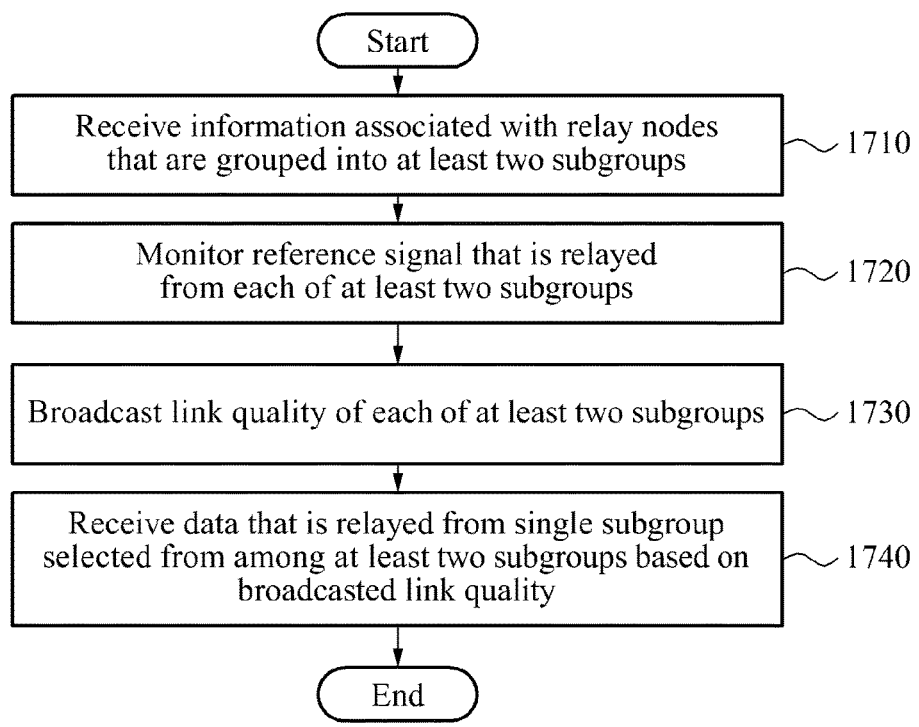
FIG. 17 is a flowchart illustrating an example of a method of an operation of a target reception node so that relay nodes for a pair of a target transmission node and the target reception node are distributedly selected when a number of relay nodes exceeds N(N−1)+1 where N denotes a number of pairs of transmission nodes and reception nodes in a multi-hop network performing interference neutralization.

FIG. 17 illustrates an example of a method of an operation of a target reception node so that relay nodes for a pair of a target transmission node and the target reception node are distributedly selected when a number of relay nodes exceeds N(N−1)+1 where N denotes a number of pairs of transmission nodes and reception nodes in a multi-hop network performing interference neutralization. Referring to FIG. 17, in operation 1710, the target reception node receives information associated with the relay nodes that are grouped into at least two subgroups to relay a signal for the pair of the target transmission node and the target reception node. In this example, the relay nodes are grouped into the at least two subgroups randomly or in a predetermined order.

In operation 1720, the target reception node monitors a reference signal that is relayed from each of the at least two subgroups. The reference signal may be relayed based on a time slot assigned in advance to each of the at least two subgroups.

In operation 1730, the target reception node measures a link quality (e.g., a channel-based metric) of each of the at least two subgroups based on results of the monitoring, and broadcasts the link quality of each of the at least two subgroups.

In operation 1740, the target reception node receives data that is relayed from a single subgroup selected from among the at least two subgroups based on the broadcasted link quality. In this example, any of the reception nodes and the relay nodes may select the single subgroup.

Figure 18:
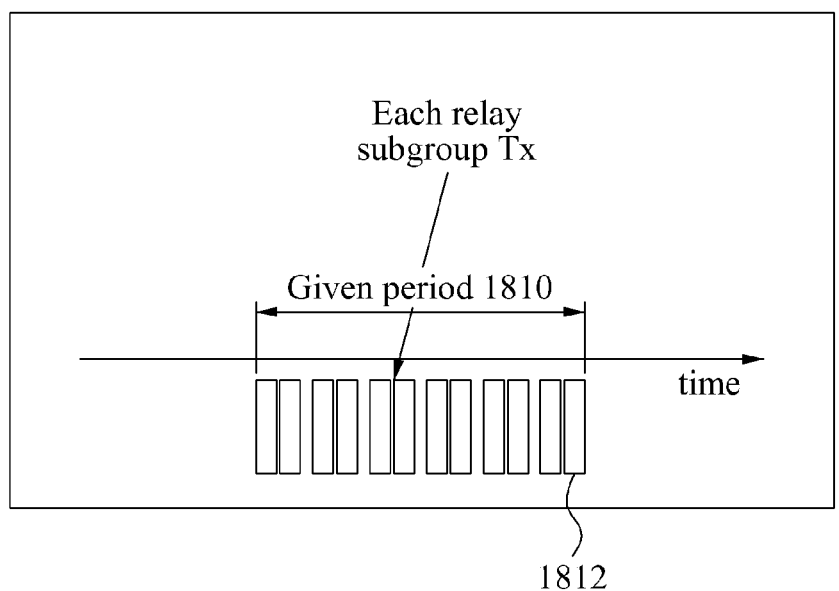
FIG. 18 is a diagram illustrating an example of a time slot assigned in advance to each of subgroups in FIGS. 14 through 17.

FIG. 18 illustrates an example of a time slot assigned in advance to each of the subgroups in FIGS. 14 through 17. Referring to FIG. 18, reception nodes may set, as a predetermined time period 1810 for the subgroups, a portion of a control channel to measure performance of relay nodes. The predetermined time period 1810 may be divided into mini-slots 1812, and a single mini-slot 1812 may be assigned to a single subgroup, e.g., a relay subgroup transmission (Tx).

For example, in the example of FIG. 14 of the cooperation header concentratedly determining the subgroup, the cooperation header assigns a mini-slot 1812 to each subgroup. In the example of FIG. 16 of distributedly determining the subgroup, each of the relay nodes may autonomously participate in a predetermined mini-slot randomly or in a predetermined order.

Figure 19:
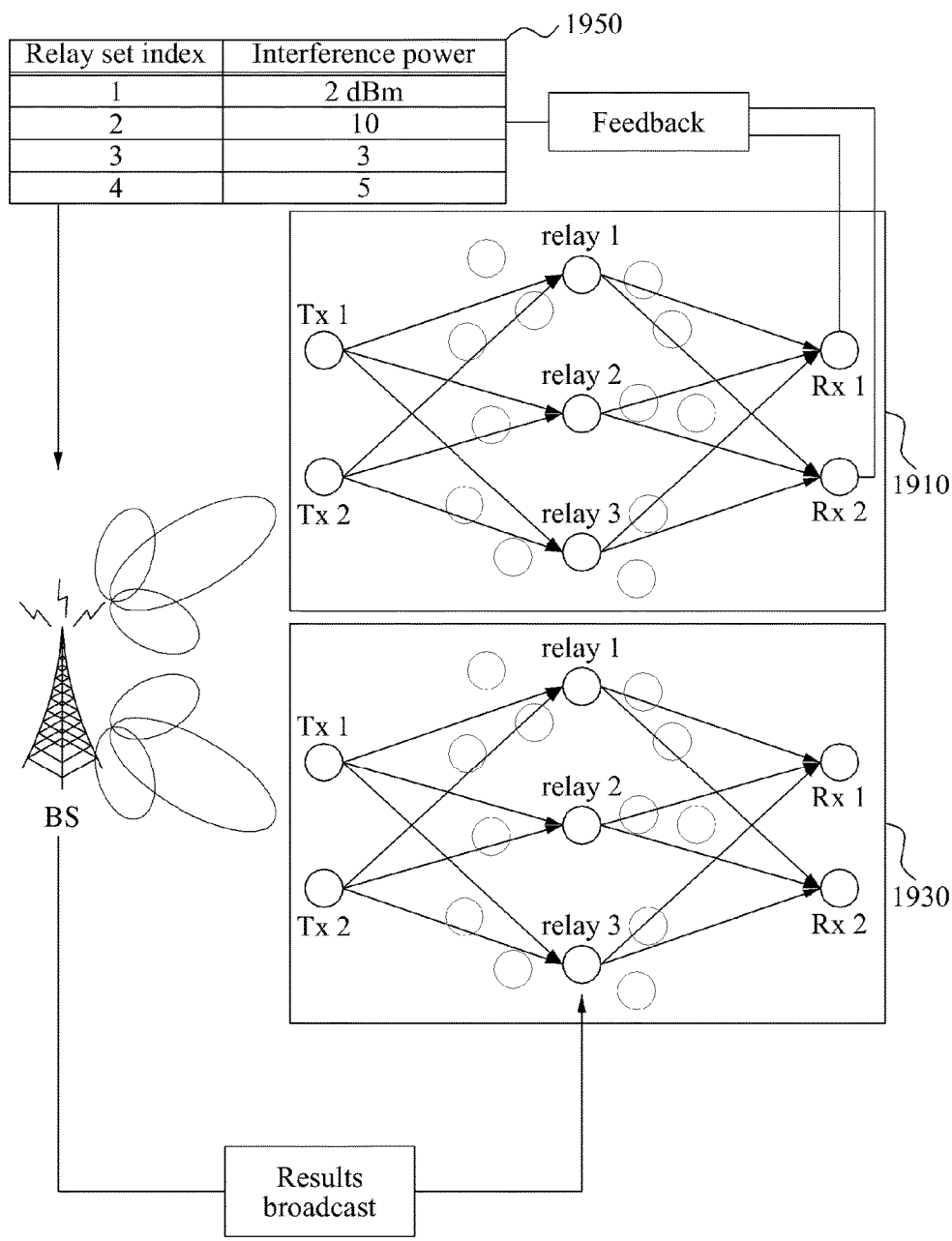
FIG. 19 is a diagram illustrating an example of selecting relay nodes when two clusters cooperate with each other for interference neutralization in a multi-hop network performing the interference neutralization.

FIG. 19 illustrates an example of selecting relay nodes when two clusters cooperate with each other for interference neutralization in a multi-hop network performing the interference neutralization. The term "cluster" refers to a cooperation group (CG) for interference neutralization, and includes a network of transmission nodes, relay nodes, and reception nodes.

From the perspective of a network, a plurality of clusters may simultaneously operate in a single multi-hop network. In this example, a resource reuse rate may be increased using a scheme such as scheduling.

Mutual interference may be minimized by disposing a plurality of clusters at a sufficient interval for the coexistence of the plurality of clusters. While this method may readily dispose the plurality of clusters, the interval between the plurality of clusters may increase, thereby lowering a resource reuse rate.

Accordingly, to increase the resource reuse rate, that is, to simultaneously support the plurality of clusters, there is a need for a method of minimizing inter-cluster interference. This method includes selecting a relay node that minimizes the inter-cluster interference for the coexistence of the plurality of clusters.

Referring to FIG. 19, in an example in which a first cluster 1910 operates, a new second cluster 1930 attempts to simultaneously operate using the same resource as the first cluster 1910. In this example, a cooperation header or a base station (BS) selects, from among relay nodes, candidates that may operate as a final relay node to minimize inter-cluster interference.

The cooperation header groups the selected candidates into subgroups, and obtains a relay node parameter that satisfies performance of the second cluster 1930, based on each subgroup. The relay node parameter may be, for example, a gain of a relay node that is calculated by the cooperation header based on a channel value. In this example, a parameter selection scheme may vary based on a cooperation method. Distributed zero-forcing for the interference neutralization may be employed.

Each of the relay nodes receives, from the cooperation header, and stores a corresponding relay node parameter determined with respect to each subgroup so that a corresponding subgroup of the corresponding relay node satisfies the interference neutralization. Each of the relay nodes operates based on the corresponding relay node parameter when each corresponding subgroups operates.

For example, if a relay node, relay 2, belongs to a subgroup 1 and a subgroup 2, a relay node parameter determined with respect to the relay 2 in the subgroup 1 may be "2.5", and a relay node parameter determined with respect to the relay 2 in the subgroup 2 may be "1.3". In this example, the relay 2 may operate based on the relay node parameter "2.5" when operating in the subgroup 1, and may operate based on the relay node parameter "1.3" when operating in the subgroup 2.

In more detail, the above subgroup-based interference measurement may be performed by determining a predetermined time period based on a transmission method of a system and/or a transmission framework. During the predetermined time period, the subgroups may alternately operate to provide an opportunity for the first cluster 1910 to measure an amount of interference according to an operation of a corresponding subgroup.

Using the above method, reception nodes of the first cluster 1910 receive, from the cooperation header, information associated with relay nodes of the second cluster 1930 that are grouped into at least two subgroups. The reception nodes of the first cluster 1910 measure an amount of interference that may occur according to an operation of each of the at least two subgroups, that is, an amount of interference of each of the at least two subgroups that affects the reception nodes of the first cluster 1910.

The reception nodes of the first cluster 1910 feeds back, to a control unit, for example, the cooperation header, information associated with the interference of each of the at least two subgroups of the second cluster 1930 that affects the reception nodes of the first cluster 1910. In this example, the information associated with the interference to be fed back may include, for example, relay set indices of the subgroups that affect the reception nodes of the first cluster 1910 and corresponding interference powers as illustrated in a table 1950. In addition, the information associated with the interference may further include information associated with a channel of each subgroup, and information associated with a quantized channel of each subgroup.

The cooperation header determines an optimal subgroup or an optimal relay node of the second cluster 1930 and a corresponding relay node parameter based on the fed back information. The cooperation header broadcasts results of the determination to the second cluster 1930.

Figure 20:
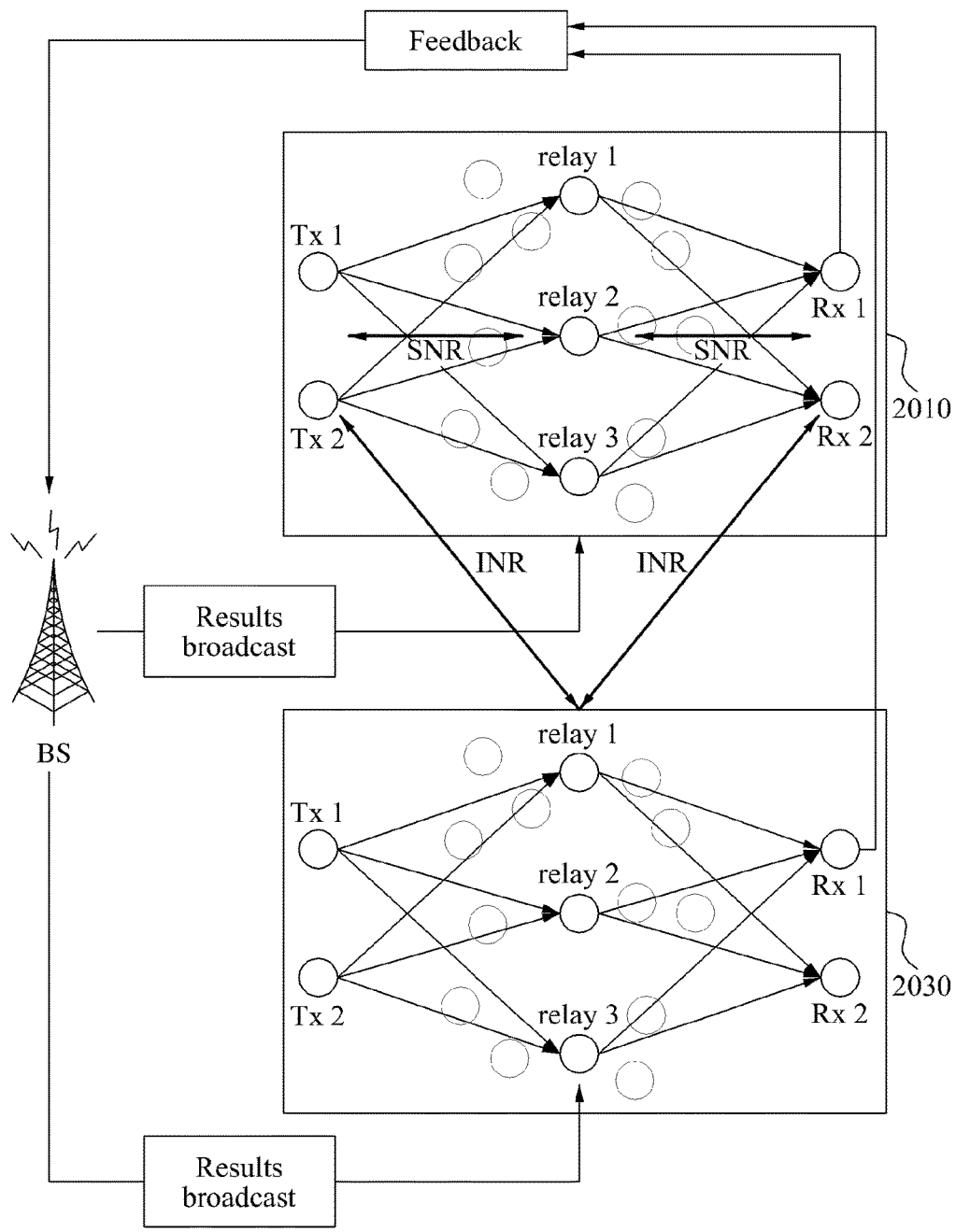
FIG. 20 is a diagram illustrating an example of determining a utilization mode of a relay node and, based on the determined utilization mode, utilizing relay nodes included in each cluster when two clusters cooperating with each other for interference neutralization interfere with each other in a multi-hop network performing the interference neutralization.

FIG. 20 illustrates an example of determining a utilization mode of a relay node and, based on the determined utilization mode, utilizing relay nodes included in each cluster when two clusters cooperating with each other for interference neutralization interfere with each other in a multi-hop network performing the interference neutralization. Referring to FIG. 20, when a plurality of clusters interfere with each other in the multi-hop network, a utilization scheme of a relay node varies based on an inter-cluster relationship, for example, an inter-cluster distance. A method of operating each of the clusters when the clusters cooperating for interference neutralization interfere with each other will be provided as follows.

For example, resources for each of the clusters may be divided two clusters may be simultaneously employed, and interference neutralization may be performed for each cluster. To determine a mode for each method, an inter-cluster relationship, for example, an in-cluster link quality and an inter-cluster link quality, may be needed. Such link quality may be determined based on measurement results that are fed back from reception nodes to a cooperation header or a base station (BS).

In more detail, each of transmission nodes transmits, to the reception nodes through relay nodes, a reference signal that all of the clusters are commonly aware of. Each of the reception nodes measures the in-cluster link quality, for example, a signal-to-noise ratio (SNR), and the inter-cluster link quality, for example, an INR, based on the reference signal. The reception nodes receive reference signals from the respective transmission nodes, and thus, the reference signals are distinguished from each other.

Each of the reception nodes feeds back at least one of the measured link qualities to the cooperation header or the base station. The cooperation header selects a utilization mode of a relay node based on at least one of the received link qualities, and broadcasts the selected utilization mode to each of the clusters.

Referring to FIG. 20, the utilization mode of the relay node may include a first mode that individually utilizes relay nodes that are included in each of a first cluster 2010 and a second cluster 2030. Alternatively, the utilization mode may include a second mode that relays a signal or divides a resource by simultaneously utilizing the relay nodes that are included in each of the first cluster 2010 and the second cluster 2030. That is, the relay nodes that are included in all of the clusters are simultaneously employed to perform the interference neutralization.

The utilization mode of the relay node may be determined based on a predetermined threshold. The threshold may be a function of the link quality, for example, an SNR and an INR. If at least one of the fed back link qualities is greater than the predetermined threshold, for example, f(SNR, INR), the cooperation header determines that the first mode is the utilization mode of the relay node. On the contrary, if at least one of the fed back link qualities is less than or equal to the predetermined threshold, for example, f(SNR, INR), the cooperation header determines that the second mode is the utilization mode of the relay node.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of distributedly determining a pair of a transmission node and a reception node in a multi-hop network performing interference neutralization, the method comprising:
    calculating a metric between the transmission node and the reception node;
    setting a standby time based on the metric;
    determining, according to the standby time, whether another reception node in the multi-hop network broadcasts a pair configuration message to configure a pair between the other reception node and the transmission node;
    broadcasting, by the reception node, a pair configuration message to the other reception node and the transmission node to configure the pair between the transmission node and the reception node, in response to determining that the other reception node does not broadcast a pair configuration message to configure the pair between the transmission node and the other reception node; and
    recognizing a pair configuration between the other reception node and the transmission node, in response to determining that the other reception node broadcasts the pair configuration message to configure the pair between the transmission node and the reception node.

2. The method of claim 1, further comprising:
    setting the standby time of the pair configuration message using a distributed timer of the reception node that is set based on the metric.

3. The method of claim 1, further comprising:
    receiving information about relay nodes grouped into subgroups to relay a signal for the pair of the transmission node and the reception node;
    monitoring a reference signal relayed from each of the subgroups; and
    measuring a link quality of each of the subgroups based on the monitoring.

4. The method of claim 3, wherein the reference signal is relayed based on a time slot assigned to each of the subgroups.

5. The method of claim 3, further comprising:
    receiving the information about the relay nodes grouped into the subgroups randomly or in a predetermined order.

6. The method of claim 3, further comprising:
    selecting a subgroup from among the subgroups based on the link quality; and
    informing the other reception node and the relay nodes about the selected subgroup.

7. The method of claim 3, further comprising:
    broadcasting the link quality to the other reception node and the relay nodes; and
    receiving data relayed from a subgroup selected by the other reception node and the relay nodes from among the subgroups based on the link quality.

8. A non-transitory computer-readable storage medium comprising instructions that, when executed, cause a computer to perform the method of claim 1.

9. The method of claim 1, wherein the broadcasting comprises broadcasting the pair configuration message to the other reception node and the transmission node in response to the other reception node not broadcasting the pair configuration message before the standby time is terminated.

10. An apparatus for distributedly determining a pair of a transmission node and a reception node in a multi-hop network performing interference neutralization, the apparatus comprising:
    a reception node configured to
    calculate a metric between the transmission node and the reception node;
    set a standby time based on the metric;
    determine, according to the standby time, whether another reception node in the multi-hop network broadcasts a pair configuration message to configure a pair between the other reception node and the transmission node;
    broadcast, by the reception node, a pair configuration message to the other reception node and the transmission node to configure the pair between the transmission node and the reception node, in response to determining that the other reception node does not broadcast a pair configuration message to configure the pair between the transmission node and the other reception node; and
    recognize a pair configuration between the other reception node and the transmission node, in response to determining that the other reception node broadcasts a pair configuration message to configure the pair between the transmission node and the other reception node.

11. The apparatus of claim 10, wherein the reception node is further configured to set the standby time of the pair configuration message using a distributed timer of the reception node that is set based on the metric.

12. The apparatus of claim 10, wherein the reception node is further configured to receive information about relay nodes grouped into subgroups to relay a signal for the pair of the transmission node and the reception node, to monitor a reference signal relayed from each of the subgroups, and to measure a link quality of each of the subgroups based on the monitoring.

13. The apparatus of claim 12, wherein the reference signal is relayed based on a time slot assigned to each of the subgroups.

14. The apparatus of claim 12, wherein the reception node is further configured to receive the information about the relay nodes grouped into the subgroups randomly or in a predetermined order.

15. The apparatus of claim 12, wherein the reception node is further configured to select a subgroup from among the subgroups based on the link quality, and to inform at least one of the other reception nodes and the relay nodes about the selected subgroup.

16. The apparatus of claim 12, wherein the reception node is further configured to broadcast the link quality to at least the other reception node and the relay nodes, and to receive data relayed from a subgroup selected by the other reception node and the relay nodes from among the subgroups based on the link quality.

17. The apparatus of claim 10, wherein the reception node is further configured to broadcast the pair configuration message to the other reception node and the transmission node in response to the other reception node not broadcasting the pair configuration message before the standby time is terminated.

* * * * *